March 26, 1968  R. J. SCHWELLER  3,375,345

METHOD OF MANUFACTURING SHOCK ABSORBER SUBASSEMBLIES

Filed July 15, 1964  2 Sheets-Sheet 1

INVENTOR.
Robert J. Schweller
BY
J.C. Evans
HIS ATTORNEY

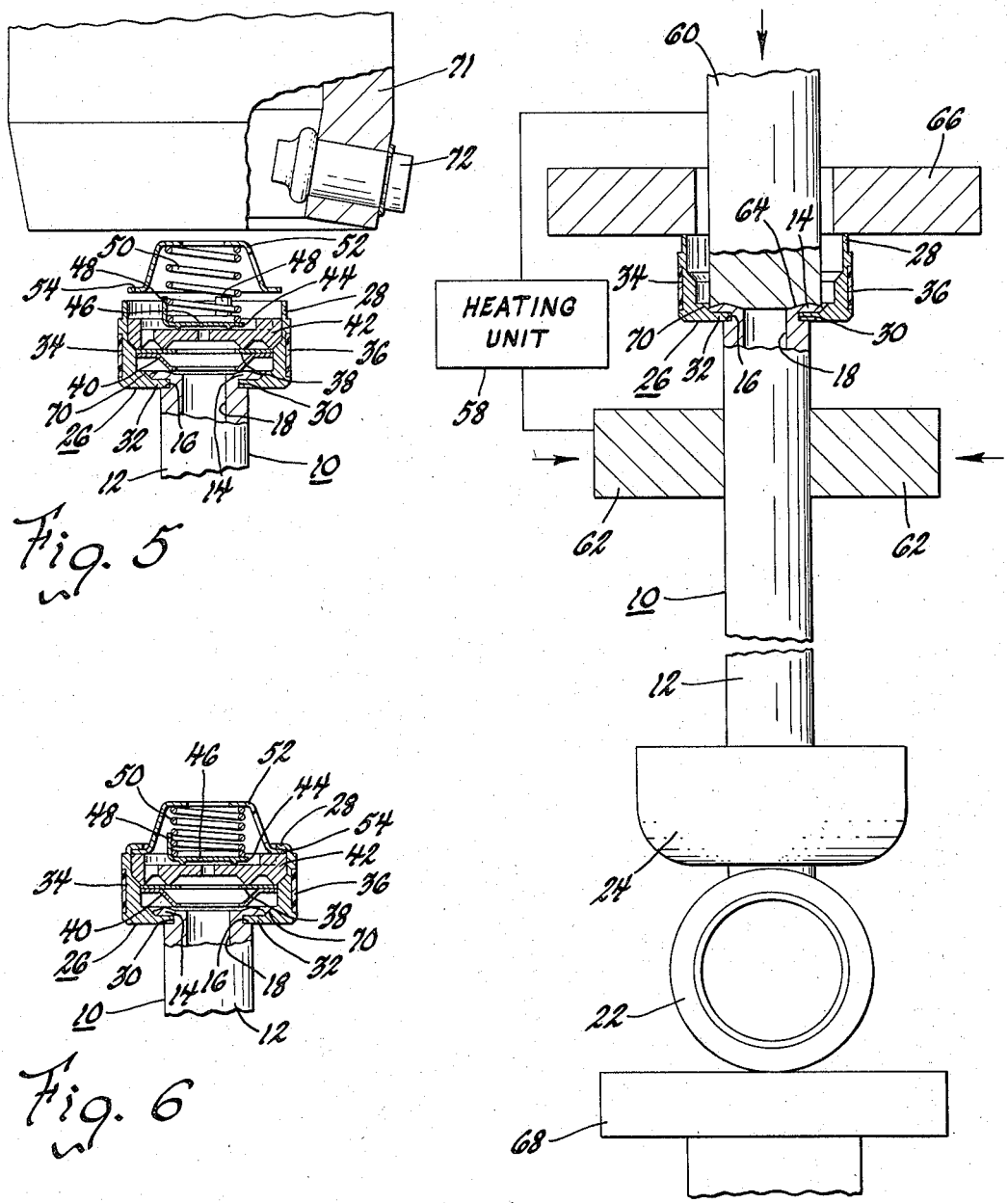

United States Patent Office 3,375,345
Patented Mar. 26, 1968

3,375,345
METHOD OF MANUFACTURING SHOCK ABSORBER SUBASSEMBLIES
Robert J. Schweller, Dayton, Ohio, assignor to General Motors Corporation, Detroit, Mich., a corporation of Delaware
Filed July 15, 1964, Ser. No. 382,749
1 Claim. (Cl. 219—107)

ABSTRACT OF THE DISCLOSURE

In preferred form, a method for manufacturing a shock absorber subassembly including a piston and a piston rod having a flow-through control passageway including the steps of preforming the piston rod to have a small diameter tubular extension on one end thereof with a uniform O.D. and an I.D. flaring radially outwardly, preforming a piston to have an end wall with a central opening therethrough and including an inclined surface within the piston surrounding the opening, connecting the two preformed parts by steps including radially outwardly deforming the walls of the small diameter extension into press-fit relationship with the inclined surface without welding the parts together and without encroaching upon the cross-sectional area of the flow passageway through the rod.

---

This invention relates to the manufacture of shock absorber assemblies and more particularly to an improved heat forming method for connecting a piston member to an associated piston rod member.

An object of the present invention is to reduce the cost of assembling shock absorber subassemblies including a piston member and a piston rod member by the provision of an improved heat forming method that produces an unusually strong permanent connection therebetween.

A further object of the present invention is to reduce the cost of manufacturing shock absorber subassemblies including a piston and a piston rod member by heat forming a portion of the piston rod into a tight prestressed engagement with a surface on the piston to effect a permanent connection therebetween while thermally isolating the piston rod from the piston member to prevent the temperature of the piston member from attaining a predetermined maximum value.

A further object of the present invention is to improve the life characteristics of a shock absorber and reduce the cost thereof by eliminating threaded connections in the assembly by means including a method contemplating the heat forming of a portion of a piston rod member into a holding engagement with a portion of a piston member wherein the heat forming includes selectively heating a portion of the piston rod and isolating the heated portion of the piston rod from the piston member so as to prevent damaging of a heat destructible seal sleeve preassembled on the piston member; and to effect such a connection of the piston member to the piston rod member without any fusion welding between the connected members and wherein the connection therebetween is effected by a prestressed engagement of the piston member by portions on the piston rod member.

Further objects and advantages of the present invention will be apparent from the following description, reference being had to the accompanying drawings wherein preferred embodiments of the present invention are clearly shown.

In the drawings:

FIGURE 4 is a view of the piston member and piston rod member during the heat forming steps in the method of the present invention.

FIGURE 5 is a fragmentary view in vertical section of the end of the subassembly with hydraulic dampening valve elements of the subassembly shown located within the piston member prior to being fastened therein.

FIGURE 6 is a fragmentary view in vertical section showing the end of the subassembly with the piston member, piston rod member and valve members in their assembled positions.

Figure 1:
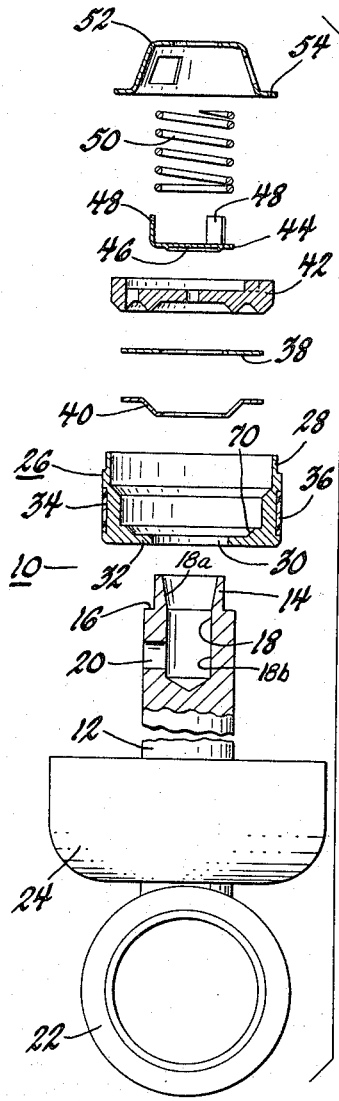
FIGURE 1 is a view in vertical section showing the parts of a subassembly in a direct, double-acting hydraulic shock absorber in an exploded relationship.

Referring now to the drawings, in FIGURE 1, a shock absorber subassembly 10 is illustrated including a piston rod member 12 that includes a small diameter tubular extension or hollow tenon portion 14 thereon which defines an abrupt annular rod shoulder 16 in surrounding relationship therewith. In the illustrated embodiment of the invention, an opening 18 is directed axially through the tenon 14 into the large diameter portion of the rod 12 where it intersects a transverse port 20 in the rod whereby a dampening fluid flow passageway is provided from the end of the piston rod 12 to a point that is axially spaced from the end of the rod. Within the rod 12 at 18a, the opening 18 is a fluid flow passageway of uniform diameter and, within the tenon at 18b, the opening 18 progresses from the diameter of 18a to a maximum inside diameter at the free end of tenon 14 for purposes to be discussed. The opposite end of the rod 12 is shown connected to a ring fitting 22 that is adapted to supportingly receive a bearing member connected to the sprung mass of a vehicle. Above the ring 22 is located an upper end closure member 24 slidably supported upon the rod 12.

The subassembly 10 further includes a piston member 26 having an open upper end formed by a thin sectioned portion 28 of the continuous side wall thereof through which the valving components of the subassembly are inserted and an opening 30 formed by an annular end wall portion 32 of the piston member 26. Continuously formed around the outer periphery of the piston is a groove 34 that supportingly receives a thin sectioned seal sleeve 36 that is made of a suitable material such as Teflon, neoprene, nylon or the like having suitable friction and resiliency properties.

Shown in FIGURE 1, in exploded relationship to the piston 26, are the members of an insertable hydraulic dampening valve assembly including an annular valve member 38 located between an annular spring member 40 and a centrally apertured valve plate 42. On the other side of the valve plate 42 is located a stamped valve 44 having a base portion 46 that is received within the centrally apertured valve plate 42 and a plurality of spaced fingers or ears 48 which supportingly receive one end of a coil spring member 50 that has the opposite end thereof in engagement with the inner surface of a conically shaped valve assembly end member 52 that has an annular outwardly directed flange 54 thereon that is held between the thin sectioned wall portion 28 and one side of the valve plate member 42 when the unit is assembled, as best illustrated in FIGURE 6.

Past practice in assembling direct, double-acting hydraulic shock absorber subassemblies including a piston rod member, a piston member and a dampening valve assembly within the piston member has included the use of threaded connecting member, for example, nuts threaded on an extension of the piston rod or plugs threaded into the end of the piston rod and a piston rod threaded into the piston to obtain a completed subassembly. Such practices necessitate much inspection to eliminate small broken burrs or the like that result during the threading operations. This unduly increases the cost of the components of the subassembly and moreover influences the cost of assembling the subassembly. Additionally, such small metal particles, if undetected, can adversely affect the operation of the assembled shock absorber by floating interiorly of the shock absorber whereby valves can become jammed and seals can become worn prematurely.

In accordance with certain principles of the present invention, a method of assembling such parts of a shock absorber is contemplated wherein the piston rod and piston unit are joined by an economical and reliable heat forming process that eliminates such problems while effecting a strong permanent union therebetween. The process, moreover, is especially suited for connecting piston members having preassembled seal sleeves thereon constructed from a heat destructible material. The improved process generally includes the steps of a preliminary loose connection of the piston rod member to the piston member; the maintenance of a space between the piston rod and the piston to prevent any significant heat transfer therebetween; a heating of a portion of the piston and a forming of the heated rod portion into engagement with an inner surface portion of the piston followed by a controlled cooling of the heated piston rod portion whereby the piston rod contracts with respect to the piston to effect a prestressed holding engagement of piston to rod.

One unit presently being assembled in accordance with the present invention includes a piston rod like 12 in FIGURE 1 of a cold drawn, mild carbon steel, for example, a 1040 SAE steel, having an outer diameter of .489 inch, a tenon having an outer diameter of .432 inch that extends .250 inch above the shoulder 16. The piston rod opening 18 is .240 inch in diameter and the transverse opening 20 has its center line located .96 inch below the shoulder 16 and is of a .25 inch diameter. The piston 26 has an O.D. at the seal sleeve 36 thereon of .999 inch; a mean inside diameter of .83 inch in the vicinity of where the valve plate 42 is seated and an opening 30 that has a diameter of .438 inch. This representative subassembly is handled as follows.

Figure 2:
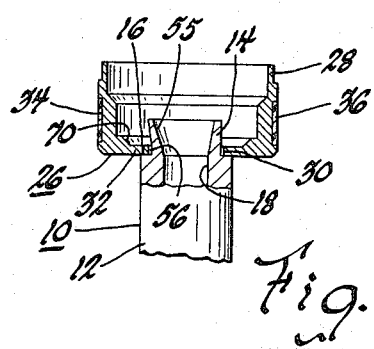
FIGURE 2 is a view in vertical section showing a piston member and a piston rod member of the subassembly in their initial relationship during the method of assembly of the present invention.

First, the tenon 14 is directed through the opening 30 in piston 26 and a portion of the tenon is staked over as at 55 in FIGURE 2 for loosely securing the piston 26 to the piston rod 12. In FIGURE 2 clearance existing between the outer surface of the tenon 14 and the end wall 32 of the piston 26 is exaggerated at 56 in FIGURES 2 and 3 to emphasize that the piston 26 is thermally insulated against direct heat conduction from the tenon 14 during the heat forming operation thereon.

Figure 3:
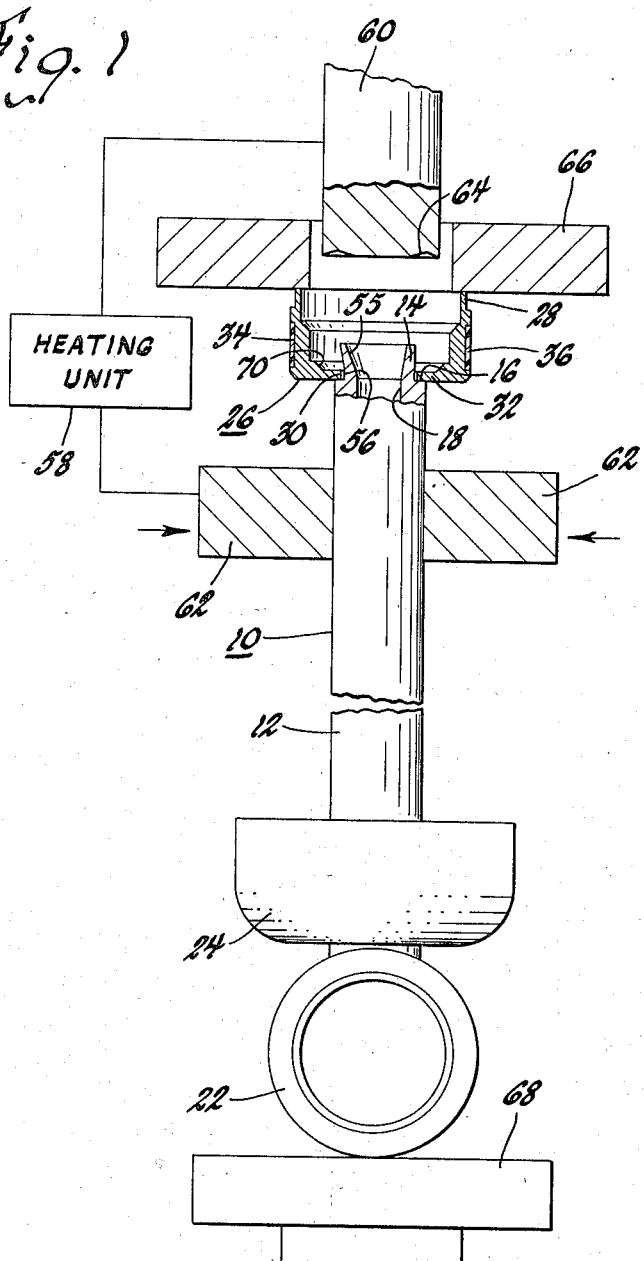
FIGURE 3 is a view of a piston member and piston rod member, partially in section, prior to being connected together by a heat forming step in the method of the present invention.

With reference to FIGURE 3, a representative arrangement for heating the tenon 14 is illustrated including an electrical heating unit 58 having a movable electrode 60 and a clamp-type lower electrode 62 that grips the piston rod 12 in the vicinity of the transverse opening thereof. In the case of the specific unit being discussed, it is located so that the upper edge or surface of the electrode 62 is approximately .035 inch above that opening. The movable electrode 60 has a tenon engaging surface thereon including an annular groove 64 that has an inclination thereon to force the wall of the tenon 14 radially outwardly of the center line of the piston rod. In the preferred construction, the opening 18 in rod 12 in part is formed by the inclined surface defined at 18b which coacts with the electrode to prevent collapsing of the formed tenon into the opening 18 which might otherwise tend to affect adversely the characteristics of dampening fluid flow in the rod.

When the piston and rod of subassembly 10 is arranged with respect to the heating unit 58, the piston 26 is held against the underside of a fixed support portion 66 of the heating unit and the piston rod is loosely concentrically aligned within the piston by the gripping electrode 62. In the illustrated arrangement, a movable support 68 in the machine releasably holds the thin-sectioned wall 28 of the piston unit against the underside of the fixed support 66.

Once the piston unit 26 and piston rod 12 have been generally concentrically aligned, as illustrated in FIGURE 3, the movable electrode 60 is moved into engagement with the end of the small diameter tenon 14 and a desired heating of the tenon is carried out by means which, in the representatively illustrated practice of the invention, includes conditioning the heating unit 58 to effect the passage of twenty-three cycles of 10,000 amp current across the electrodes 60, 62. This heating cycle raises the temperature of the tenon 14 to a point just below its yield temperature and then pressure is applied through the electrode 60 to force or heat form the walls of the small diameter tenon 14 radially outwardly of the center line of the rod 12 and against the inner surface of the end wall 32 as best shown in FIGURE 4. During this heating the clearance 56 between the tenon 14 and the piston 26 prevents any substantial heat conductive interchange therebetween so that the piston remains substantially below the yield temperature of the tenon. Hence, in cases where a presassembled heat destructible sleeve is present, it will not be affected adversely by the heat forming step of the improved method. Furthermore, heat forming the tenon in this manner produces concentricity between piston and rod.

The illustrated step of heat forming also forces a portion of the tenon 14 to overlie an inclined face 70 on the piston 26 whereby the connection between piston rod 12 and the piston assembly 26 is effectively further strengthened because of the greater surface area contacted by the heat formed tenon portion of the piston rod 12.

Following the initial heating step, a post heat operation is carried out to effect a desired annealing of the connection. In the case of the specific subassembly under consideration, the post heat operation includes four phases each including an application of twenty cycles of 5000–6000 amps across the electrodes whereby the heat formed tenon is gradually cooled to maintain desired strength characteristics therein.

By virtue of the heating operation, as illustrated and discussed with reference to FIGURE 4, it is important to note that the heat formed and radially outwardly directed portion of the tenon 14 is not fused or welded with the end wall of the piston unit. Rather, since the piston unit 26 is relatively cold as compared to the heated tenon 14, when the tenon 14 cools, it contracts against the inner surface of the end wall 32 and biases it against the supporting shoulder 16 so as to effect a prestressed holding engagement of the piston unit 26 between heat formed tenon 14 and the shoulder 16. It has been found that the elimination of welding effects a connection between piston rod 12 and piston 26 having unusually improved strength capabilities that completely meet a strength criteria for the unit under consideration including a connection tensile strength having a 6,000 pound minimum yield strength and a 10,000 pound minimum ultimate yield strength and also a fatigue life defined by a continuous cycling between 3,000 pounds tensile and 500 compression of 5,000 cycles without fracture or cracking of the connection between the piston rod 12 and the piston 26.

Following connection of the piston rod 12 to the piston 26, as shown in FIGURE 5, the unit is moved to a station where the thin sectioned wall 28 of the piston 26 is rolled to retain the previously assembled valve package within the interior of the piston 26. In FIGURE 5, this step is representatively shown as being carried out by means of a conventional roller head 71 having circumferentially spaced tools 72 thereon that spin roll the wall 28 over. Following the spin rolling step, the thin wall 28 is bent inwardly to overlie the annular flange 54 on the end retainer of the valve assembly and the valve components are held in an operative relationship within the piston 26 as clearly shown in FIGURE 6.

While the embodiments of the present invention as herein disclosed constitute preferred forms, it is to be understood that other forms might be adopted.

What is claimed is as follows:

1. A method for manufacturing shock absorber subassemblies including a piston member and an elongated piston rod having a flow-through control passageway having a predetermined cross-sectional area extending from one end of the rod to a lateral relief port and wherein the opening to the passageway is in direct fluid flow relationship with shock absorber valving components housed within the piston comprising the steps of, preforming the piston rod to have a small diameter tubular extension on one end thereof with a substantially uniform O.D. and a radially outwardly flared I.D. merging with the control passageway and of a maximum diameter at the end of the tenon, preforming a piston member to have an end wall with a center opening and inclined surface formed radially outwardly of the center opening and in surrounding relationship therewith, loosely connecting the tubular extension on the piston rod within the center opening of the piston member, connecting the piston rod across a source of electric current by engaging a first electrode with the free end of the tubular extension and a second electrode with the outer periphery of the piston rod, electrically heating the tubular extension by passing current between the first and second electrodes, pressing the first electrode against the extension at the preformed radially outwardly flared I.D. thereof to force the extension radially outwardly of the center line of the flow-through control passageway in the rod and concurrently pressing the extension downwardly against the inside surface of the preformed piston member end wall in part to overlie the aforementioned inclined surface and to be held in interlocked engagement therewith without being fusion welded thereto, and preforming the electrode face to prevent the entrance of the deformed parts of the extension from encroaching upon the preformed cross-sectional area of the flow passageway in the piston rod.

References Cited
UNITED STATES PATENTS

| | | | |
|---|---|---|---|
| 1,578,019 | 3/1926 | Ellis et al. | 219—107 |
| 1,583,758 | 5/1926 | White | 219—107 |
| 1,587,445 | 6/1926 | Thomson | 219—150 |
| 2,091,982 | 9/1937 | Hart | 219—107 |
| 2,237,121 | 4/1941 | Stine et al. | 219—150 |
| 2,765,395 | 10/1956 | Kurth et al. | 219—78 |
| 3,039,798 | 6/1962 | Carlson et al. | 219—107 |
| 3,132,235 | 5/1964 | Pribonic | 219—107 |

RICHARD M. WOOD, *Primary Examiner.*

W. D. BROOKS, *Assistant Examiner.*

UNITED STATES PATENT OFFICE
CERTIFICATE OF CORRECTION

Patent No. 3,375,345                                      March 26, 1968

Robert J. Schweller

It is certified that error appears in the above identified patent and that said Letters Patent are hereby corrected as shown below:

Column 4, line 20, "aaginst" should read -- against --.
Column 6, line 24, "3,132,235" should read -- 3,132,237 --.

Signed and sealed this 2nd day of December 1969.

(SEAL)
Attest:

Edward M. Fletcher, Jr.
Attesting Officer

WILLIAM E. SCHUYLER, JR.
Commissioner of Patents